United States Patent [19]

Komatsu

[11] Patent Number: 5,247,588
[45] Date of Patent: Sep. 21, 1993

[54] METHOD OF IMAGE RESTORATION

[75] Inventor: Fumio Komatsu, Tokyo, Japan

[73] Assignee: Kabushiki Kaisha Toshiba, Kanagawa, Japan

[21] Appl. No.: 744,402

[22] Filed: Aug. 13, 1991

[30] Foreign Application Priority Data

Aug. 14, 1990 [JP] Japan .................... 2-213781

[51] Int. Cl.$^5$ .............................. G06K 9/40
[52] U.S. Cl. ...................... 382/54; 250/311; 382/22
[58] Field of Search ............... 382/54, 22, 6, 27, 65; 250/227.2, 396 R, 397, 311; 364/413.13; 358/111

[56] References Cited

U.S. PATENT DOCUMENTS

| | | | |
|---|---|---|---|
| 4,433,438 | 2/1984 | Couturier | 382/54 |
| 4,503,461 | 3/1985 | Nishimura | 364/414 |
| 4,691,366 | 9/1987 | Fenster et al. | 382/54 |
| 4,782,399 | 11/1988 | Sato | 358/280 |
| 4,794,531 | 12/1988 | Morishita et al. | 364/412.13 |
| 4,811,239 | 3/1989 | Tsao | 358/283 |
| 4,817,184 | 3/1989 | Thompson et al. | 382/22 |
| 4,841,374 | 6/1989 | Kotani et al. | 358/280 |
| 4,965,842 | 10/1990 | Crossley et al. | 382/22 |
| 4,974,261 | 11/1990 | Nakahara et al. | 382/22 |
| 5,029,227 | 7/1991 | Kawamura | 382/54 |
| 5,050,227 | 9/1991 | Furusawa et al. | 382/54 |
| 5,068,908 | 11/1991 | Inoue et al. | 382/22 |

FOREIGN PATENT DOCUMENTS 2215623 10/1985 United Kingdom .

OTHER PUBLICATIONS

European Search Report, Application No. 91113646.3, Sep. 14, 1992.
Reimer, Ludwig, "Scanning Electron Microscopy", (Springer-Verlag: New York), 1985, pp. 220–226.

Primary Examiner—Joseph Mancuso
Attorney, Agent, or Firm—Finnegan, Henderson, Farabow, Garrett & Dunner

[57] ABSTRACT

In a method of image restoration of an image picture obtained from a scanning electron microscopy, an image enhancement process and a differential process, such as a Sobel filtering process, are carried out separately at the same time onto image data having undergone ordinary smoothing process. Then, these two image data obtained from said two processes are synthesized together. The finally obtained image data, therefore, contain both characteristics which have been included in said two processes. So, fine changes existing in an original image can be reconstructed clearly in the finally obtained image picture.

9 Claims, 3 Drawing Sheets

POSITION OF PICTURE ELEMENT

METHOD OF IMAGE RESTORATION

BACKGROUND OF THE INVENTION

1. Field of the Invention

This invention relates to a method of image restoration. More particularly, it relates to a method of image restoration which is used to improve the quality of image pictures obtained from a scanning electron microscopy (SEM).

2. Description of the Prior Art

The following techniques have been used widely as image restoration process to improve the quality of image pictures.

(1) Smoothing process

This process shows its real ability when the difference of frequency spectrum between the signal component and the noise component of an input signal is relatively large. Three operating methods for this process are as follows.

1) Convolution process: this is a method to convolute obtained image pictures directly. A spatial filtering process and a median filtering process are included in this method.

2) Frequency region process: this is a method to execute Fourier transform onto obtained image data, first, in order to convert them into the data expressed in a frequency region, then, to apply a filter (such as a Gauss filter, a Haming filter, a Haning window filter etc.) to the data, and finally to execute inverte Fourier transform.

(2) Averaging process

This process accumulates data for every picture element by repeating inputs, and calculates the average among the data for each of the picture elements. Unlike the smoothing process, this method does not require a large difference in frequency spectrum between the signal component and the noise component of the image picture.

Among the smoothing processes mentioned above, the convolution process process is widely used as a low pass filter especially in a relatively low frequency region. The aim of this process is, thus, to detect embedded signals, which have relatively low frequencies, from among random noise having relatively high frequency component. In a prior art, therefore, said smoothing process is used in combination with said averaging process for the image restoration. In other words, in order to reconstruct an image picture, the noise component, which has different frequency spectrum from the signal component, is removed by the smoothing process, while the other random noise are removed by the averaging process in order to reconstruct an image picture.

In the process mentioned above, let the variance of noise in an original image picture, which has not been processed yet, be $\sigma_{org}^2$, the variance of noise in an image picture, which has been subjected to the averaging process, be $\sigma_{avr}^2$, the variance of noise in an image picture, which has been subjected to the smoothing process, be $\sigma_{smo}^2$, and the addition time or the sample points of smoothing be N. In the case where the noise have no correlation to each other, the relation between $\sigma_{smo}^2$ and $\sigma_{avr}^2$ can be expressed as follows.

$$\{\sigma_{smo}^2 | \sigma_{avr}^2\} = \sigma_{org}^2 / N \quad (1)$$

On the other hand, if the noise have a perfect correlation to signal, said relation can be expressed as follows.

$$\{\sigma_{smo}^2 | \sigma_{avr}^2\} = \sigma_{org}^2 \quad (2)$$

Usually, each noise has some degree of correlation for signal so that the effect has an intermediate value between said (1) and (2). As understood from equation (1), the effect of noise reduction is improved as the value N increases. On the other hand, distortion of the signal increases gradually as the value N increases. This is because there is an opposite relation between the noise reduction and the distortion of signals.

In order to reconstruct fine changes on an image picture, therefore, it is necessary to reduce the smoothing points and to increase the number of additions as much as possible. To accomplish this situation, objects should be ones in which the precision of synchronization at additions is high enough and no change during these additions occurs according to time change.

In the image restoration process of the prior art mentioned above, the following disadvantages occur according to the radiation of electron beams.

(1) A phenomenon occurs, in which the diameter of grains become large or a film is formed on a grain surface, as the sample observation by an SEM continues. This phenomenon is called "contamination", and is caused by carbide, which exists in a specimen chamber and change its quality so as to adhere to the sample surface by electron bombardment. The established theory of this mechanism is the surface diffusion theory. In other words, this phenomenon is caused by hydrocarbon molecules which change in quality to reduce the surface area and adhere to the sample surface by electron bombardment. The molecules are, then, supplied to electron bombardment areas by surface diffusion. As a result of this contamination phenomenon, the brightness of SEM image pictures decreases as the time progress. Therefore, in said averaging process, the addition times by which fine changes in objects are found, cannot be made so large. From said model, the contamination rate K is calculated as follows.

$$K \propto J_o / r_o^2 (1 + J_o \sigma \tau / e)$$

In the equation described above, $J_o$ means the current gray level of the electron beam, $r_o$ means the radius of the electron beam, $\sigma$ means the sectional area of contamination, and $\tau$ means the residence time of diffused molecules.

(2) During the observation of insulators by an SEM, white shining parts arise on the image picture when the acceleration voltage of the electron beam goes too high beyond a certain voltage. In this case, a distortion sometimes arises on the image picture. The cause of this phenomenon is considered to be as follows. When the acceleration voltage of the electron beam becomes too high, as mentioned above, the ratio of secondary electron release from a sample becomes less than one. As a result, the sample surface is negatively charged to cause said phenomenon. This phenomenon is called the charge-up phenomenon. The waveforms of signals become distorted as a result of this charge-up phenomenon. In the measurement of the line width of signals, therefore, the degree of dispersion among measured values increases to cause wrong interpretation for observed image pictures.

According to said two points, especially in the observation of insulators by an SEM, an electron beam having high energy cannot be used to improve the resolution of image pictures. Therefore, an electron beam having relatively low energy, compared to the case in which metal samples are observed, should be used to observe insulator samples. It is also necessary to reduce addition times in the image restorating process, in order to prevent the generation of contamination. As a result, fine changes existing in an object cannot be found clearly from insulator samples by the prior art image restoration processes mentioned above. A novel process for image restoration is, therefore, necessary for the observation of insulator samples by an SEM.

The details concerning the above mentioned problems regarding electron bombardment by an SEM are described in "Scanning Electron Microscopy", by L. Reimer, Springer Verlag, N.Y., 1985.

SUMMARY OF THE INVENTION

This invention has been made to overcome the above mentioned problems included in the prior art method of image restoration.

The objective of the present invention is, therefore, to provide a new method of image restoration in which fine changes existing in objects can be seen clearly even if an electron beam having relatively low energy is used to obtain an SEM image picture.

One aspect of this invention provides a method of image restoration in which an image enhancement process and a differential process, such as a Sobel filtering process, are applied separately to SEM image data operating under the ordinary averaging process. One kind of image data resulting from the image enhancement process and another kind of image data resulting from the differential process are, then, synthesized into one kind of image data to reconstruct image pictures.

According to this aspect of the present invention, said differential process is applied to, for example, x, y, and the diagonal directions of the image picture which results in enhancement the edges of fine changes in the image picture. Then, said image picture subjected to said differential process and another image picture subjected to said image enhancement process are synthesized into one picture. The synthesized picture, therefore, has mixed characteristics obtained from both of said processes, that is, the differential process and the image enhancement process. In other words, fine changes on an object, which cannot be reconstructed clearly through the prior art process, can be reconstructed clearly by the method according to this invention.

These and other objects, features, and advantages of the present invention will be more apparent from the following detailed description of preferred embodiments in conjunction with the accompanying drawings.

BRIEF DESCRIPTION OF THE DRAWINGS

FIG. 3 is a block diagram showing an apparatus by which some of said steps shown in FIG. 1 are executed; and.

DETAILED DESCRIPTION OF PREFERRED EMBODIMENT

A method of image restoration according to one embodiment of this invention will be explained in detail below by referring to the flow-chart shown in FIG. 1.

Figure 1:
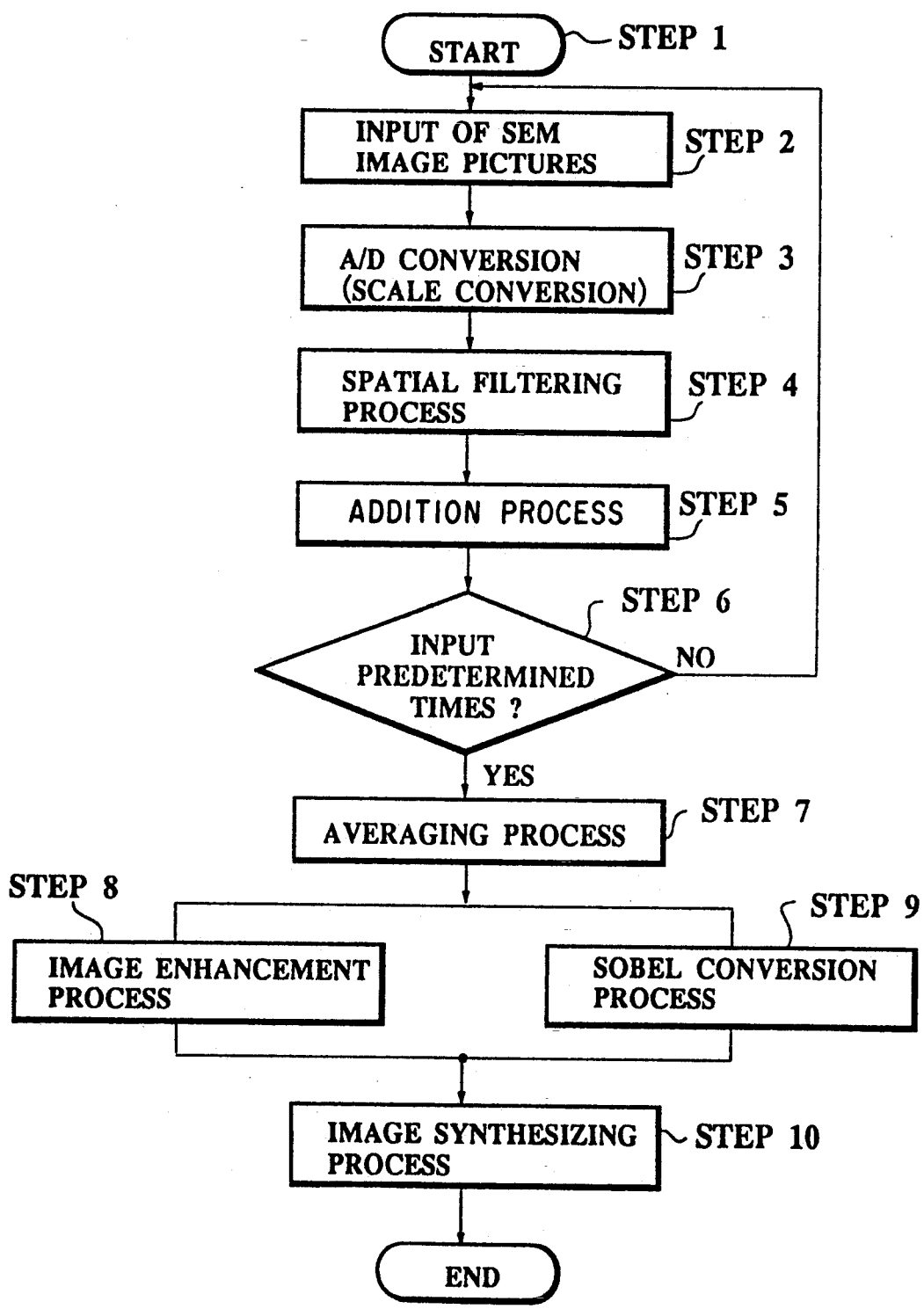
FIG. 1 is a flow-chart showing the steps in a method of image restoration according to one embodiment of the present invention.

First, as shown in FIG. 1, the method starts from step 1 and secondary electron signals are input to an image processor from a scanning electron microscopy (SEM) in step 2. Next, the input secondary electron signals are subjected to analog digital conversion (A/D conversion) and these are saved and stored in a frame memory as image data having 256 gray levels in step 3. Said input signals should be digitalized by said A/D conversion in preparation for the next filtering process. Otherwise, if signals stay in analog form, an analog filter is needed to carry out the filtering process. With this analog filter, however, it is difficult to change the characteristics of filter matrix optionally to meet the characteristics of signals and noises.

Next, a spatial filtering process is carried out in step 4. In this step, the smoothing point is set to a filter matrix of 3×3. When the diameter of the electron beam is equal to the size of one picture element, the matrix is written as follows.

$$\begin{pmatrix} 1 & 1 & 1 \\ 1 & 1 & 1 \\ 1 & 1 & 1 \end{pmatrix}$$

On the other hand, if the magnification of the microscopy increases and the beam diameter becomes greater than the size of one picture element, some modification such as weighting is adopted to the matrix.

In step 5, in order to execute the adding processes successively, the image data, which have been subjected to said spatial filtering process, are transmitted into frame memories having a 12 bit depth and added successively in step 5. This step is called the addition process. In this embodiment, a picture element is processed by an 8 bit gray level so that a frame memory having a 12 bit depth is sufficient for this use.

In step 6, the sequence described above is repeated by predetermined times. When the step 6 has been completed, that is, said sequence has been repeated by predetermined times, then, an averaging process is executed in step 7. This is a process of the type in which, for example, if there are 8 time inputs, each value of picture elements should be divided by 8 (concretely, to execute a shift operation by 3 bits).

In this invention, the image enhancement process in step 8, which is to emphasize the contrast of image, and the Sobel filtering process in step 9, which is to detect fine changes on a pattern surface, are executed in parallel to the image which has been subjected to said averaging process in order to improve the S/N ratio as mentioned above. Both images obtained from step 8 and step 9 are, then, synthesized into one image in step 10 to obtain the finally processed image.

Next, steps 8, 9, and 10 will be explained in detail. The image data, which have undergone said averaging process, are processed in step 8 to complete the image enhancement process, and then the processed data are stored into frame memory (I). At the same time, the Sobel matrix is convoluted to said image data, which have undergone said averaging process, in order to carry out differential operations in x, y, and the (45°) diagonal directions. First, a convolution operation is executed on the image data by using the matrix $$\begin{pmatrix} -1 & 0 & 1 \\ -2 & 0 & 2 \\ -1 & 0 & 1 \end{pmatrix}$$

in order to execute differential operations in x direction (also in said diagonal direction). The operation result is, then, stored into frame memory (II). Next, a convolution operation is executed on the image data by using the matrix $$\begin{pmatrix} -1 & -2 & -1 \\ 0 & 0 & 0 \\ 1 & 2 & 1 \end{pmatrix}$$

in order to execute differential operations in y direction (also in said diagonal direction). The operation result is then stored into frame memory (III). The image data stored in frame memories (II) and (III) are, then, added to each other and the adding result is stored in frame memory (IV). Therefore, the data stored in frame memory (IV) become corresponded to the image data which have undergone differential operations in x, y, and the diagonal directions.

Lastly, the image data stored in frame memory (I) at step 8 and the image data stored in frame memory (IV) at step 9 are synthesized at step 10 to complete the method at step 11. Concretely, averaging processes (to shift one bit after the adding process) among images are used to synthesize images.

Figure 3:
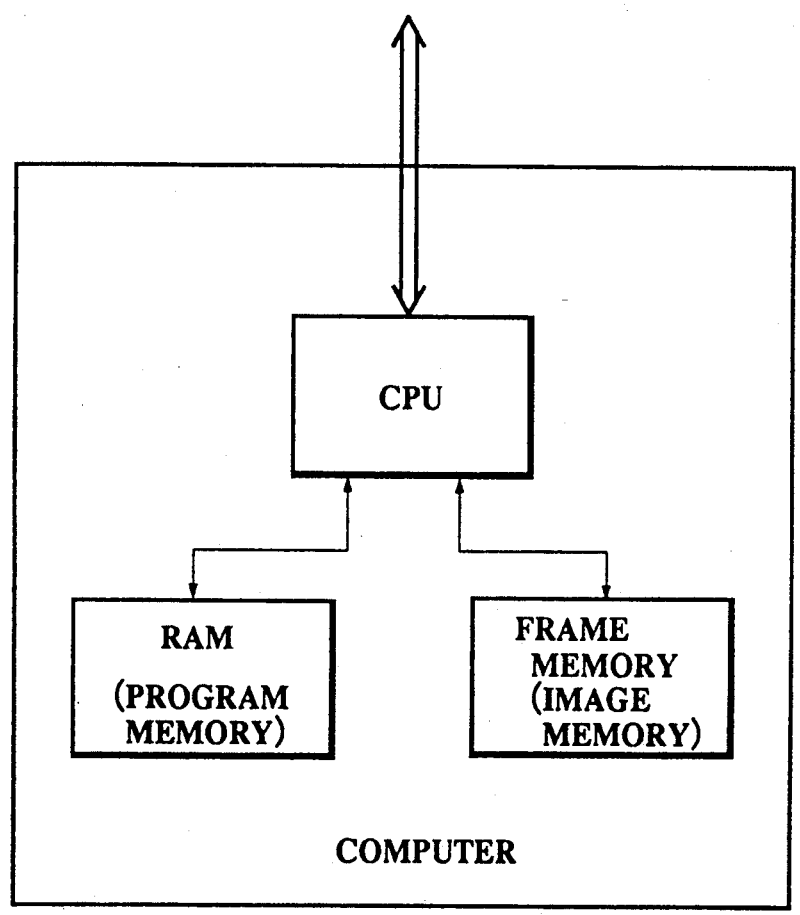

Although a computer is commonly used to execute said method of image restoration, as shown in FIG. 3, it is apparent that an alternative apparatus can be easily composed for this special purpose.

Said image enhancement process in step 8 and the Sobel filtering process in step 9 will be explained briefly below.

(Linear) Image enhancement process

First, the maximum gray level value $F_{max}$ and the minimum gray level value $F_{min}$ of gray level (having values between $0 \sim 255$, if each picture element has 256 gray levels) are detected among all of the picture elements contained in an image picture. Next, each picture element is extracted and the following operation is carried out at the gray level F of each picture element extracted. Thus, the gray level F is transformed into the new gray level X as follows.

$$X = C \times (F - F_{min})/(F_{max} - F_{min})$$

Figure 2:
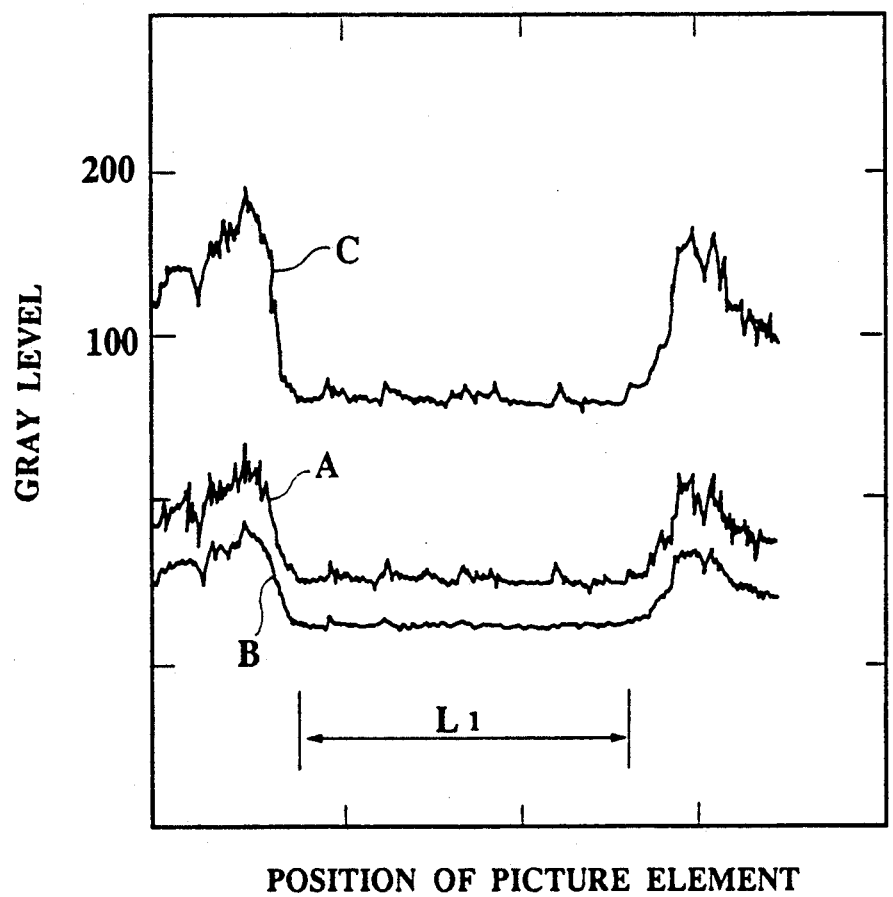
FIG. 2 is a graph explaining the effect of the image enhancement process involved in said steps shown in FIG. 1.

In the equation, C means a constant. If C is 255, then the image is emphasized in the range between $0 \sim 255$. FIG. 2 shows wave forms of image signals, two of which are made from images A and B without having undergone said image enhancement process, and another of which is made from image C having undergone said image enhancement process. These waveforms of signals have been obtained from images of objects having hole patterns when scanned by an SEM. In the figure, therefore, $L_1$ shows the diameter of a hole. Waveform A results from the waveform of input signal which has proceeded as far as said averaging process shown in FIG. 1. On the other hand, waveform B results from the waveform of input signal which has proceeded as far as the spatial filtering process. It is apparent from FIG. 2 that the gray level variation of waveform C which has undergone the image enhancement process is more distinct than those of waveforms A and B.

Sobel filtering process

A sobel filter is comprised of two kinds of filter matrix, that is, $\Delta X_n$ and $\Delta Y_n$. Here, n means a parameter showing the dimension of a filtering area. When n equals one, operations take place in a filtering area of $3 \times 3$. When n equals two, operations take place in a filtering area of $5 \times 5$. Therefore, when n equals one, $$\Delta X_1 = \begin{pmatrix} -1 & 0 & 1 \\ -k & 0 & k \\ -1 & 0 & 1 \end{pmatrix}$$

$$\Delta Y_1 = \begin{pmatrix} -1 & -k & -1 \\ 0 & 0 & 0 \\ 1 & k & 1 \end{pmatrix}$$

In the equation, K is a parameter based on an incline to be detected, and is usually one or two. $\Delta Y_1$ is the transposed matrix of $\Delta X_1$.

Consequently, the final image signal output, obtained after the Sobel filtering process has been completed, can be written as follows:

$$G(i,j) = (\Delta X_i(i,j)^2 + \Delta Y_i(i,j)^2)^{\frac{1}{2}}$$

wherein, $$\Delta X_i(i,j) = \sum_{u=-1}^{1} \sum_{v=-1}^{1} \Delta X_i(u,v) \cdot g(u+i, v+i)$$

$$\Delta Y_i(i,j) = \sum_{u=-1}^{1} \sum_{v=-1}^{1} \Delta Y_i(u,v) \cdot g(u+i, v+i)$$

In the equation, g means a function showing the gray level of each picture element.

In this embodiment, as described above, differential operations using the Sobel operator are used to detect fine changes on the surface of an object. There are widely used differential operations other than the Sobel filtering, for example, the Laplacian process. In this Laplacian process, the matrix written below is used.

$$\begin{pmatrix} 0 & -1 & 0 \\ -1 & 4 & -1 \\ 0 & -1 & 0 \end{pmatrix}$$

However, the convolution operation using the Sobel operators is especially effective in the case where shape changes contained in an object exist not only in x and y directions but in other directions as well. In other words, the convolution operation using the Sobel operator is, generally speaking, very effective for such edge detection.

In the embodiment mentioned above, a linear enhancement process is used as the image enhancement process. However, this invention is not limited only to such use of a linear process. Apparently, a non-linear process such as logarithm conversion can be used as the image enhancement process so as to obtain the same advantages.

In summary as explained above by referring to the embodiment, it is possible in the image restoration process according to this invention that image pictures, (those in which fine changes existing on an object surface are easily discriminated), can be obtained by processing the original image picture obtained by scanning using relatively low energy. Therefore, even if the object is, for example, an insulator of the type which generates contaminations after repeating the averaging processes or which generates image distortion by the charge-up phenomenon, this invention can provide image pictures from which fine changes existing on an object's surface are easily discriminated. So, this method is very useful as an image restoration method for SEM pictures.

Various modifications will become possible for those skilled in the art after receiving the teachings of the present disclosure without departing from the scope thereof.

What is claimed is:

1. A method of image restoration in order to reconstruct a clear image from an image picture obtained from a scanning electron microscopy (SEM) by digitalizing said image picture, the method comprising the steps of:
   executing an analog-digital conversion of the image picture obtained from the SEM in order to obtain image data;
   executing a smoothing process to said image data;
   executing an averaging process to the image data which have undergone said smoothing process;
   executing an image enhancement process to the image data which have undergone said averaging process;
   executing a differential process to a plurality of directions of said image data which have undergone said averaging process; and
   synthesizing said data, which have undergone said image enhancement step with said data which have undergone said differential process.

2. The method of image restoration as claimed in claim 1, wherein said smoothing process includes a spatial filtering process.

3. The method of image restoration as claimed in claim 1, wherein said differential step includes a Sobel filtering process.

4. The method of image restoration as claimed in claim 1, wherein said differential step includes a Laplacian process.

5. The method of image restoration as claimed in claim 1, wherein said image enhancement step includes a linear enhancement process and a non-liner enhancement process such as logarithm conversion.

6. The method of image restoration as claimed in claim 1, wherein said differential process is carried out in all directions of x, y, and the diagonal directions of the image picture.

7. A method of image restoration in order to reconstruct a clear image from an image picture obtained from a scanning electron microscopy (SEM) by digitalizing said image picture, the method comprising the steps of:
   executing an analog-digital conversion of said image picture obtained from the SEM in order to obtain image data;
   executing a spatial filtering process to said image data;
   executing an averaging process to said image data which have undergone said spatial filtering process;
   executing an image enhancement process to said image data which have undergone said averaging process;
   executing a Sobel filtering process to a plurality of directions of said image data which have undergone said averaging process; and
   synthesizing said image data having undergone said image enhancement process with image data having undergone said Sobel filtering process.

8. The method of image restoration as claimed in claim 7, wherein said image enhancement process includes linear enhancement processes and non-linear enhancement processes such as logarithm conversion.

9. The method of image restoration as claimed in claim 7, wherein said differential process is carried out in all directions of x, y, and the diagonal directions of the image picture.

* * * * *